(12) United States Patent
Shaffer et al.

(10) Patent No.: US 6,865,259 B1
(45) Date of Patent: *Mar. 8, 2005

(54) APPARATUS AND METHOD FOR FORWARDING A MESSAGE WAITING INDICATOR

(75) Inventors: Shmuel Shaffer, Palo Alto, CA (US); William Joseph Beyda, Cupertino, CA (US)

(73) Assignee: Siemens Communications, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,775

(22) Filed: Oct. 2, 1997

(51) Int. Cl.[7] .................................................. H04M 1/64
(52) U.S. Cl. ............................. 379/88.12; 379/211.02
(58) Field of Search ........................ 379/88.12, 88.13, 379/88.14, 88.15, 88.22, 88.23, 88.25, 211.01, 211.03

(56) References Cited

U.S. PATENT DOCUMENTS

| | | | | |
|---|---|---|---|---|
| 4,086,441 A | * | 4/1978 | Ullakko et al. | 379/376 |
| 4,506,115 A | * | 3/1985 | Schmitt | 379/376 |
| 4,873,713 A | * | 10/1989 | Yamanouchi et al. | 379/88.27 |
| 5,012,233 A | * | 4/1991 | Poulsen, Jr. | 340/825.18 |
| 5,177,780 A | * | 1/1993 | Kasper et al. | 455/413 |
| 5,260,986 A | * | 11/1993 | Pershan | 455/413 |
| 5,418,835 A | * | 5/1995 | Frohman et al. | 455/413 |
| 5,521,964 A | * | 5/1996 | Schull et al. | 379/88.12 |
| 5,661,781 A | * | 8/1997 | DeJager | 379/88.12 |
| 5,706,211 A | * | 1/1998 | Beletic et al. | 709/206 |
| 5,761,294 A | * | 6/1998 | Shaffer et al. | 379/230 |
| 5,802,166 A | * | 9/1998 | Garcia et al. | 379/372 |
| 5,802,466 A | * | 9/1998 | Gallant et al. | 379/372 |
| 5,825,852 A | * | 10/1998 | DePond et al. | 379/88.12 |
| 5,889,839 A | * | 3/1999 | Beyda et al. | 379/88.12 |
| 5,905,776 A | * | 5/1999 | Shaffer | 379/88.22 |
| 5,944,786 A | * | 8/1999 | Quinn | 709/206 |
| 5,995,595 A | * | 11/1999 | Hickey et al. | 379/88.12 |
| 5,999,611 A | * | 12/1999 | Tatchell et al. | 379/211 |

* cited by examiner

*Primary Examiner*—Fan Tsang
*Assistant Examiner*—Roland G. Foster

(57) ABSTRACT

An improved voicemail system (101) that allows a message waiting indicator to be forwarded to a remote location is disclosed. The voicemail system (101) includes a voice mail controller (103), a home location (105), and a remote location (109). A user of the voicemail system (101) is assigned a home location (105) for the reception of calls and deposition of voice messages. The user can configure the voice mail controller (103) to forward a message waiting indicator to the remote location (107) when a message is left. The voice mail controller (103) stores a table (401) that indicates the location to which a message waiting indicator should be forwarded to for each user of the voicemail system (101).

14 Claims, 4 Drawing Sheets

| USER | HOME PHONESET | REMOTE PHONESET |
|------|---------------|-----------------|
| A | 0010 | – |
| B | 2876 | 8923 |
| C | 3495 | – |
| • | • | • |
| • | • | • |
| • | • | • |
| X | 2415 | 1974 |
| Y | 3007 | – |
| Z | 0097 | 3978 |

FIG. 4

APPARATUS AND METHOD FOR FORWARDING A MESSAGE WAITING INDICATOR

FIELD OF THE INVENTION

The present invention relates to voicemail systems, and more particularly, to a voicemail system that can indicate that a message is waiting for a caller at a remote location.

BACKGROUND OF THE INVENTION

Voicemail has become ubiquitous. These voicemail systems allow users to store incoming messages and retrieve them at their convenience. Nearly all voicemail systems have one or more methods of notifying the user that a new message has been left. This is referred to in the art as a "message waiting indicator".

Oftentimes, these message waiting indicators are tied to a specific physical telephone. For example, for a voice mailbox that is provided by the local telephone company on a residential line, the message waiting indicator is often a "stutter tone" that is placed on the dial tone upon picking up a telephone in the residence. In a business that uses a private branch exchange (PBX) voicemail system, it is more common for the telephone assigned to that particular user in his office to have a light that indicates that a message is waiting. In either case, the message waiting indicator is tied to a particular phone or incoming line.

However, in organizations that have multiple sites that are commonly tied together by a common phone system, the user may be off-site visiting another location within the organization. In such a situation, important messages that are left in the "home" voice mailbox of the user may go unnoticed unless there is some method of notifying the user that a new message has been left.

Prior art attempts to notify the user include outdialing to a pager or other service when a message has been left. However, this method is disruptive and relatively complicated. Additionally, this requires the user have a paging service or other service that will notify the user of a new message.

Alternatively, a guest voice mailbox could be set up for the user at the remote location. However, this requires some sort of action from the system administrator to set up passwords and the like.

Lastly, the user could simply poll their mailbox frequently to determine if new messages have been left. However, this may prove to be inconvenient and costly if the remote location is distant from the home location of the user.

Thus, what is needed is a method to notify a user at a remote location that a new message has been left in the user's mailbox.

SUMMARY OF THE INVENTION

An improved voicemail system that allows a message waiting indicator to be forwarded to a remote location is disclosed. The voicemail system includes a voice mail controller, a home location, and a remote location. A user of the voicemail system is assigned a home location for the reception of calls and deposition of voice messages. The user can configure the voice mail controller to forward a message waiting indicator to the remote location when a message is left. The voice mail controller stores a table that indicates the location to which a message waiting indicator should be forwarded to for each user of the voicemail system.

In operation, the user can configure the table by means of a touchtone keypad. The user can direct the message waiting indicator to a desired remote location. When an incoming call is received, and the user does not answer, the caller can leave a message with the voicemail system. The voice mail controller then examines the table to determine where the message waiting indicator should be routed. Once that is determined, the message waiting indicator is forwarded to that location.

BRIEF DESCRIPTION OF THE INVENTION

The foregoing aspects and many of the attendant advantages of this invention will become more readily appreciated as the same becomes better understood by reference to the following detailed description, when taken in conjunction with the accompanying drawings, wherein:

FIG. 4 is a table used by the present invention to associate a user with a phoneset that is to receive a message waiting indicator.

DETAILED DESCRIPTION OF THE PREFERRED EMBODIMENT

Figure 1:
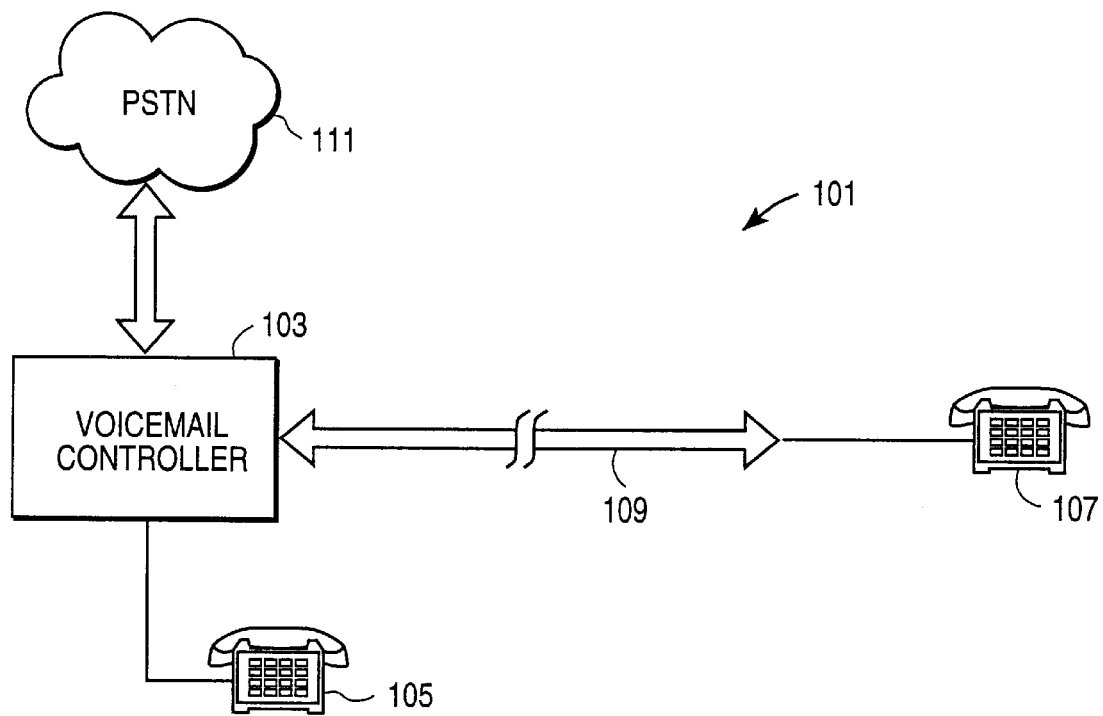
FIG. 1 is a schematic illustration of a voice mail system formed in accordance with the present invention.

FIG. 1 illustrates a PBX voicemail system 101 consisting of a voice mail controller 103, a home location 105, and a remote location 107. The remote location 107 is connected to the voice mail controller 103 by a link network 109. It can be appreciated that the voicemail system 101 includes other components that are not germane to the present invention. For example, the voicemail system 101 will include hard disks that store the voice messages, input and output trunks that connect to a public switched telephone network (PSTN) 111, and other similar types of components. Additionally, only a single home location 105 is shown. It can be appreciated that the voicemail system 101 includes many multiple telephone sets that are associated with various users. The term "home location" is used in the present context to indicate the home phoneset that is assigned to a user. Thus, all incoming calls from the public switched telephone network 111 are routed by the voice mail controller 103 to the appropriate phoneset. The routing is oftentimes coordinated by an operator (such as a telephone receptionist) that manually commands the voice mail controller to route the call to a desired phoneset. To accomplish these tasks, the voice mail controller 103 typically includes a central processing unit and various types of temporary and permanent memory components.

The present invention describes a voicemail system that can be configured by a user such that a message waiting indicator can be forwarded to a remote location 107 from the user's home location 105' This is generally accomplished by having the voice mail controller 103 keep an associative table that corresponds each user to a phoneset that is to receive any message waiting indicators.

For example, FIG. 4 shows such a table 401. It can be appreciated that the table 401 is merely illustrative and that the voice mail controller 103 will store the table 401 in one of any number of formats. The table 401 consists of a user column 403, a home phoneset column 405, and a remote phoneset column 407. The user column 403 identifies all of the users of the voicemail system 101. The home phoneset column 405 identifies the phoneset that is assigned to that user as the default phoneset. For example, the identification in this column may be the telephone extension of the user. Finally, the remote phoneset column 407 is the identification of the phoneset that the user wishes a message waiting indicator to appear. Note that only users B, X, and Z have remote phoneset identifiers. This would indicate that only users B, X, and Z are traveling away from their home phoneset and wish to have their message waiting indicators forwarded to the remote extensions 8923, 1974, and 3978, respectively. Users A, C, and Y will have all message waiting indicators routed to their "default" home phoneset.

A user of the voicemail system 101 can easily configure their voice mailbox to forward a message waiting indicator. Much like changing a greeting or a password on a voice mailbox, the user can enter a configuration menu and choose to modify table 401 by means of touchtone keystrokes. For example, the user may enter the voicemail system and select the "Remote Message Indicator" option. At this point, the user will enter in the remote phoneset that the user wishes the message waiting indicator to be forwarded to. Alternatively, the user may choose another option entitled "Remove Remote Message Indicator" at which point, the remote phoneset column 407 for the user is erased.

Figure 2:
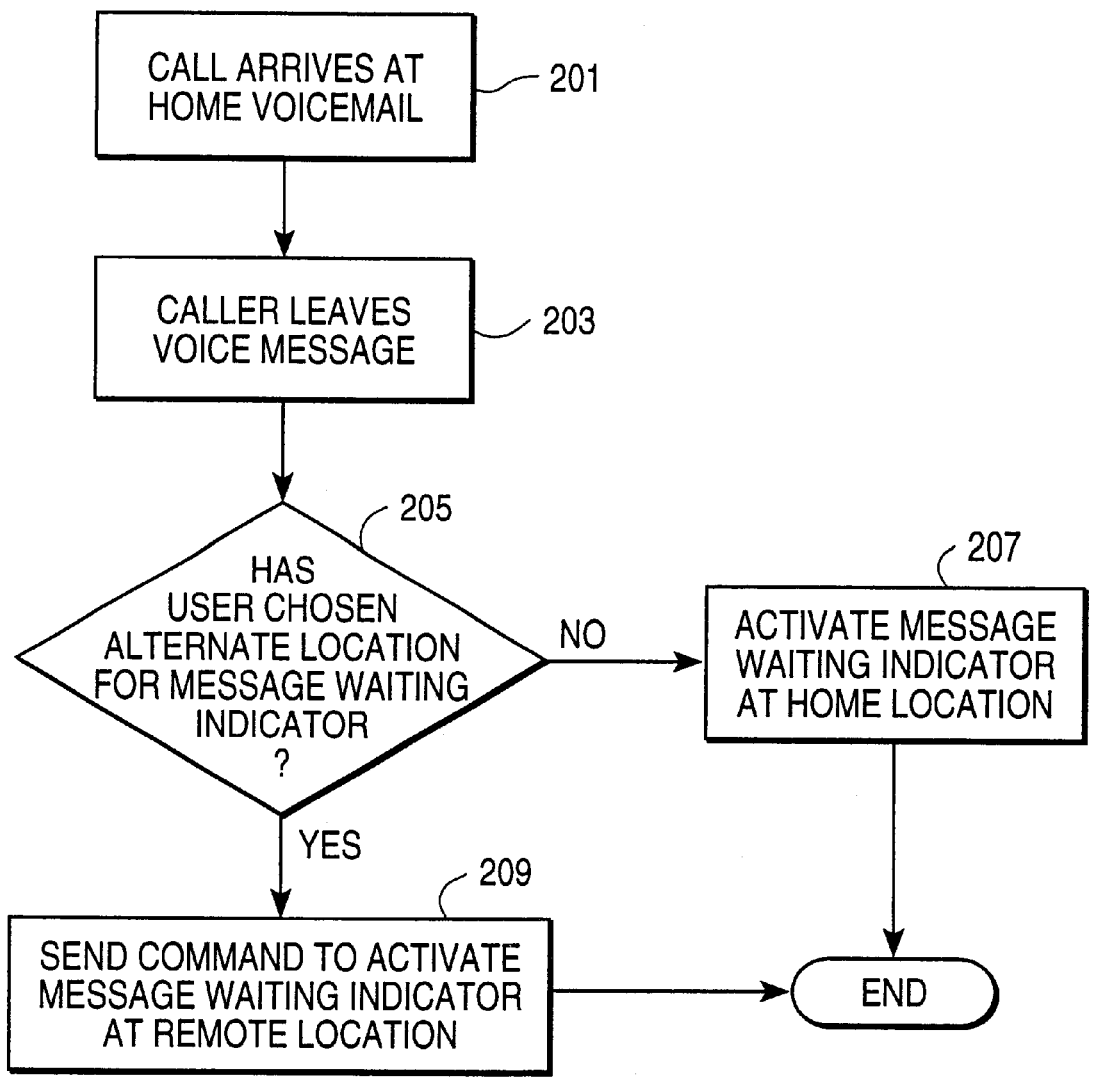
FIG. 2 is a flow diagram illustrating the method of the present invention for processing a new message.

The processing of an incoming call to a user can be seen in reference to FIG. 2. Specifically, at box 201, when a call arrives at the home location 105 for a user, and the user is not present to receive the call, the caller is routed to the voice mailbox of that user. Thus, at box 203, the caller leaves a voice message for the user. Next, at a box 205, the voice mail controller 103 determines if the user has chosen an alternate location where the message waiting indicator light should be activated. This is done by consulting the table 401. As discussed above, each user has the option of configuring his or her voice mailbox to select an alternate location which will receive any message waiting indicators for the user's voice mailbox.

If at box 205, the user has not chosen an alternate location where the message waiting indicator should be sent, then at box 207, the voice mail controller 103 activates the message waiting indicator at the home location 105.

However, if the user has chosen an alternate location for the message waiting indicator, then at a box 209, the voice mail controller 103 sends a command over the link network 109 to activate the message waiting indicator at the user's desire remote location, for example, at remote location 107. The particular remote location 107 for that user is determined by examining the table 401. In an alternative embodiment, at box 209, not only is the message waiting indicator activated at the remote location 107, but it is also activated at the home location 105. This dual activation is desirable, for example, if the user forgets to deactivate the routing of message waiting indicators to the remote location.

Figure 3:
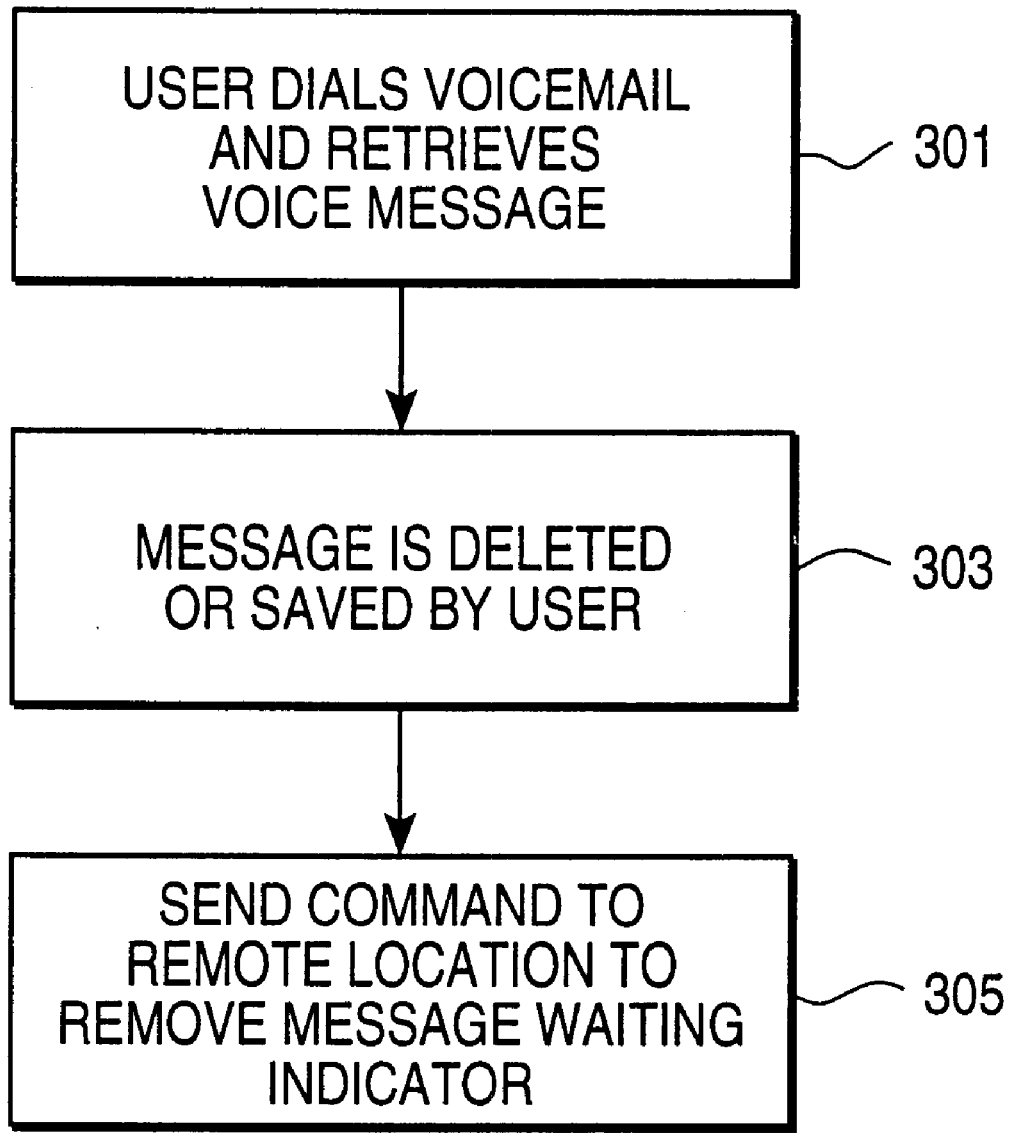
FIG. 3 is a flow diagram illustrating the method of the present invention for retrieving a new message from the voice mail system.

Turning next to FIG. 3, when the user wishes to retrieve the voice message, at box 301, the user dials the voice mail access number and enters the user's voice mailbox in accordance with normal standard procedures. After the voice message has been reviewed by the user, the message can either be deleted or saved by the user at box 303. Next, at box 305, the voice mail controller 103 sends a command to the remote location to remove the message waiting indicator.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating a message waiting indicator for a user of a voicemail system, the method comprising the steps of:
   said user optionally configuring said system to activate said message waiting indicator at the user's choice of any of a set of telephones in said system, said set including at least one telephone assigned to another user;
   receiving a voice message for said user at a home location; and
   determining if said user has configured said voicemail system to activate said message waiting indicator at a remote telephone, and if so, activating said message waiting indicator at said remote telephone, and if not, activating said message waiting indicator at a home telephone;
   wherein said message waiting indicator alerts the user to the presence of a received voice message without ringing the chosen telephone, and wherein the message waiting indicator remains activated until the user has received the voice message.

2. The method of claim 1 wherein said voicemail system services a plurality of users and further including the step of maintaining a table that assigns each of said plurality of users to said remote telephone of the user's choice if the user has configured the system with a remote telephone for the activation of said message waiting indicator, and or said home telephone associated with that user if the user has not.

3. The method of claim 1 further wherein if said user has configured said voicemail system to activate said message waiting indicator at said remote telephone, further activating a message waiting indicator at said home telephone.

4. The method of claim 2 further wherein if a user has configured said voicemail system to activate a message waiting indicator at said remote telephone associated with that user, also activating a message waiting indicator at said home telephone associated with that user.

5. A voicemail system that can activate a message waiting indicator for a user of said voicemail system in response to a voice message, the voicemail system comprising:
   means for configuring said voicemail system to activate said message waiting indicator at the user's choice of any of a set of telephones in said system, said set including at least one telephone assigned to another user;
   means for receiving said voice message for said user at a home location; and
   means for determining if said user has configured said voicemail system to activate said message waiting indicator at said remote telephone, and if so, activating said message waiting indicator at said remote telephone, and if not, activating said message waiting indicator at a home telephone wherein said message waiting indicator comprises a signal that alerts a user to the presence of a received voice message without ringing the chosen telephone.

6. The system of claim 5 wherein said voicemail system services a plurality of users and further includes means for maintaining a table that assigns each of said plurality of users to said remote telephone of the user's choice if the user has configured the system with a remote telephone for the activation of said message waiting indicator and said home telephone if the user has not.

7. The system of claim 5 further including means for determining if said user has configured said voicemail system to activate said message waiting indicator at said remote telephone, and for further activating a message waiting indicator at said home telephone.

8. The system of claim 6 further including means for determining if said user has configured said voicemail system to activate said message waiting indicator at said remote telephone, and if so, for further activating a message waiting indicator at said home telephone.

9. The system of claim 5 further including means for deactivating said message waiting indicator when said voice message is deleted by said user and when said voice message is saved by said user.

10. The system of claim 7 further including means for deactivating said message waiting indicator when said voice message is deleted by said user and when said voice message is saved by said user.

11. A voicemail system for servicing a user, said voicemail system including means for activating a message waiting indicator in response to a voice message being left for said user, said voicemail system comprising:

a plurality of phonesets; and a voice mail controller maintaining a record that assigns said user to a home telephone, said home telephone being one of said plurality of phonesets, said voice mail controller being controllable at the option of said user to modify said record to also assign said user to a remote telephone, said remote telephone being the user's choice of any of a set of telephones in said system, said set including at least one telephone assigned to another user;

wherein said message waiting indicator is a signal that alerts the user to the presence of a received voice message without ringing the home telephone and wherein the message waiting indicator is activated at said remote telephone if said user has chosen to configure said record to assign said remote telephone, otherwise said message waiting indicator being activated at said home telephone.

12. The system of claim 11 further wherein said voice mail controller deactivates said message waiting indicator when said voice message is deleted by said user and when said voice message is saved by said user.

13. The method of claim 1, wherein said message waiting indicator is a stutter tone.

14. The method of claim 1, wherein said message waiting indicator for said remote telephone is a light associated with said remote telephone.

* * * * *